US007226541B2

(12) United States Patent  
Muller et al.

(10) Patent No.: US 7,226,541 B2
(45) Date of Patent: Jun. 5, 2007

(54) MEMBRANE POLYMER COMPOSITIONS

(75) Inventors: Heinz-Joachim Muller, Thornleigh (AU); Daniel Mullette, Westmead (AU)

(73) Assignee: Siemens Water Technology Corp., Warrendale, PA (US)

( * ) Notice: Subject to any disclaimer, the term of this patent is extended or adjusted under 35 U.S.C. 154(b) by 225 days.

(21) Appl. No.: 10/738,628

(22) Filed: Dec. 16, 2003

(65) Prior Publication Data

US 2004/0191894 A1 Sep. 30, 2004

Related U.S. Application Data

(63) Continuation of application No. PCT/AU02/00784, filed on Jun. 14, 2002.

(30) Foreign Application Priority Data

Jun. 20, 2001 (AU) .................................. PR5843

(51) Int. Cl.
  B01D 29/00 (2006.01)
  B01D 65/00 (2006.01)
  B29C 47/92 (2006.01)
  B29C 47/88 (2006.01)
(52) U.S. Cl. .......................... 210/500.36; 210/500.42; 210/500.27; 210/500.23; 264/41; 264/209.1; 264/211.16
(58) Field of Classification Search ........... 210/500.36, 210/500.42, 500.23, 490, 321.89, 500.27; 264/41, 48, 49, 176.1, 177.1, 211.17, 177.8, 264/178.12, 177.19, 209.1, 211; 521/64, 521/134; 428/323
See application file for complete search history.

(56) References Cited

U.S. PATENT DOCUMENTS

| 3,228,876 A | 1/1966 | Mahon |
| 3,625,827 A | 12/1971 | Wildi et al. |
| 3,693,406 A | 9/1972 | Tobin |
| 3,708,071 A | 1/1973 | Crowley |
| 3,876,738 A | 4/1975 | Marinaccio et al. |
| 3,968,192 A | 7/1976 | Hoffman et al. |
| 3,992,301 A | 11/1976 | Shippey et al. |
| 3,993,816 A | 11/1976 | Baudet et al. |
| 4,188,817 A | 2/1980 | Steigelmann |
| 4,192,750 A | 3/1980 | Elfes et al. |
| 4,193,780 A | 3/1980 | Cotton et al. |
| 4,203,848 A | 5/1980 | Grandine, II |
| 4,218,324 A | 8/1980 | Hartmann et al. |
| 4,230,583 A | 10/1980 | Chiolle et al. |
| 4,248,648 A | 2/1981 | Kopp |
| 4,302,336 A | 11/1981 | Kawaguchi et al. |
| 4,340,479 A | 7/1982 | Pall |
| 4,353,802 A | 10/1982 | Hara et al. |
| 4,384,474 A | 5/1983 | Kowalski |
| 4,385,150 A | 5/1983 | Miyake et al. |
| 4,388,189 A * | 6/1983 | Kawaguchi et al. ........ 210/490 |
| 4,407,975 A | 10/1983 | Yamaguchi |
| 4,431,545 A | 2/1984 | Pall et al. |
| 4,451,369 A | 5/1984 | Sekino et al. |
| 4,511,471 A | 4/1985 | Müller |
| 4,540,490 A | 9/1985 | Shibata et al. |
| 4,547,289 A | 10/1985 | Okano et al. |
| 4,609,465 A | 9/1986 | Miller |
| 4,614,109 A | 9/1986 | Hoffman |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,596 A | 3/1987 | Schlueter et al. |
| 4,656,865 A | 4/1987 | Callan |
| 4,660,411 A | 4/1987 | Reid |
| 4,670,145 A | 6/1987 | Edwards |
| 4,673,507 A | 6/1987 | Brown |
| 4,687,561 A | 8/1987 | Kunz |
| 4,688,511 A | 8/1987 | Gerlach et al. |
| 4,702,836 A * | 10/1987 | Mutoh et al. .......... 210/500.23 |
| 4,702,840 A | 10/1987 | Degen et al. |
| 4,708,799 A | 11/1987 | Gerlach et al. |
| 4,718,270 A | 1/1988 | Storr |
| 4,744,240 A | 5/1988 | Reichelt |

(Continued)

FOREIGN PATENT DOCUMENTS

DE 4113420 A 10/1992

(Continued)

OTHER PUBLICATIONS

U.S. Appl. No. 10/437,202, filed May 12, 2003, Muller.

(Continued)

Primary Examiner—Ana Fortuna

(57) ABSTRACT

The invention relates to a terpolymer of tetrafluoroethylene (TFE) monomer, polyvinylidene fluoride (PVDF) monomer and hexafluoropropylene (HFP) monomer for forming an ultrafiltration or microfiltration membrane, method of forming said membranes, and to the ultrafiltration or microfiltration membranes themselves. The invention also relates to a method of forming a polymeric ultrafiltration or microfiltration membrane including preparing a leachant resistant membrane dope which incorporates a leachable pore forming agent, casting a membrane from the dope and leaching the pore forming agent from the membrane. The invention also relates to a method of preparing a polymeric ultrafiltration or microfiltration membrane of improved structure including the step of adding a nucleating agent to the membrane dope before casting.

15 Claims, No Drawings

U.S. PATENT DOCUMENTS

| | | | |
|---|---|---|---|
| 4,756,875 A | 7/1988 | Tajima et al. | |
| 4,763,612 A | 8/1988 | Iwanami | |
| 4,767,539 A | 8/1988 | Ford | |
| 4,775,471 A | 10/1988 | Nagai et al. | |
| 4,779,448 A | 10/1988 | Gogins | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,840,227 A | 6/1989 | Schmidt | |
| 4,846,970 A | 7/1989 | Bertelsen et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,921,610 A | 5/1990 | Ford et al. | |
| 4,931,186 A | 6/1990 | Ford et al. | |
| 4,935,143 A | 6/1990 | Kopp et al. | |
| 4,963,304 A | 10/1990 | Im et al. | |
| 4,968,430 A | 11/1990 | Hildenbrand et al. | |
| 4,968,733 A * | 11/1990 | Muller et al. | 521/64 |
| 4,999,038 A | 3/1991 | Lundberg | |
| 5,005,430 A | 4/1991 | Kibler et al. | |
| 5,015,275 A | 5/1991 | Beck et al. | |
| 5,024,762 A | 6/1991 | Ford et al. | |
| 5,043,113 A | 8/1991 | Kafchinski et al. | |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,076,925 A | 12/1991 | Roesink et al. | |
| 5,079,272 A * | 1/1992 | Allegrezza et al. | 521/134 |
| 5,094,750 A | 3/1992 | Kopp et al. | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,158,721 A | 10/1992 | Allegrezza et al. | |
| 5,182,019 A | 1/1993 | Cote et al. | |
| 5,192,456 A | 3/1993 | Ishida et al. | |
| 5,194,149 A | 3/1993 | Selbie et al. | |
| 5,198,116 A | 3/1993 | Comstock et al. | |
| 5,198,162 A * | 3/1993 | Park et al. | 264/49 |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,275,766 A | 1/1994 | Gadkaree et al. | |
| 5,286,324 A | 2/1994 | Kawai et al. | |
| 5,297,420 A | 3/1994 | Gilliland et al. | |
| 5,320,760 A | 6/1994 | Freund et al. | |
| 5,353,630 A | 10/1994 | Soda et al. | |
| 5,361,625 A | 11/1994 | Ylvisaker | |
| 5,364,527 A | 11/1994 | Zimmerman et al. | |
| 5,389,260 A | 2/1995 | Hemp | |
| 5,401,401 A | 3/1995 | Hickok | |
| 5,403,479 A | 4/1995 | Smith et al. | |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,451,317 A | 9/1995 | Ishida et al. | |
| 5,470,469 A | 11/1995 | Eckman | |
| 5,477,731 A | 12/1995 | Mouton | |
| 5,479,590 A * | 12/1995 | Lin | 345/611 |
| 5,480,553 A | 1/1996 | Yamamori et al. | |
| 5,484,528 A | 1/1996 | Yagi | |
| 5,525,220 A | 6/1996 | Yagi | |
| 5,531,848 A | 7/1996 | Brinda et al. | |
| 5,531,900 A | 7/1996 | Raghaven et al. | |
| 5,543,002 A | 8/1996 | Brinda et al. | |
| 5,554,283 A | 9/1996 | Brinda et al. | |
| 5,607,593 A | 3/1997 | Cote et al. | |
| 5,639,373 A | 6/1997 | Mahendran et al. | |
| 5,643,455 A | 7/1997 | Kopp et al. | |
| 5,647,988 A | 7/1997 | Kawanishi et al. | |
| 5,747,605 A | 5/1998 | Breant et al. | |
| D396,046 S | 7/1998 | Scheel et al. | |
| 5,783,083 A | 7/1998 | Henshaw et al. | |
| D396,726 S | 8/1998 | Sadr et al. | |
| D400,890 S | 11/1998 | Gambardella | |
| 5,906,742 A | 5/1999 | Wang et al. | |
| 5,910,250 A | 6/1999 | Mahendran et al. | |
| 5,914,039 A | 6/1999 | Mahendran | |
| 5,918,264 A | 6/1999 | Drummond et al. | |
| 5,942,113 A | 8/1999 | Morimura | |
| 5,944,997 A | 8/1999 | Pedersen et al. | |
| 5,958,243 A | 9/1999 | Lawrence et al. | |
| 5,988,400 A * | 11/1999 | Karachevtcev et al. | 210/483 |
| 6,024,872 A | 2/2000 | Mahendran | |
| 6,039,872 A | 3/2000 | Wu et al. | |
| 6,042,677 A | 3/2000 | Mahendran et al. | |
| 6,045,698 A | 4/2000 | Cote et al. | |
| 6,045,899 A | 4/2000 | Wang et al. | |
| 6,048,454 A | 4/2000 | Jenkins | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A * | 8/2000 | Radovanovic et al. | 210/500.36 |
| 6,146,747 A | 11/2000 | Wang et al. | |
| 6,156,200 A | 12/2000 | Zha et al. | |
| 6,159,373 A | 12/2000 | Beck et al. | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 * | 8/2001 | Hamrock et al. | 429/33 |
| 6,280,626 B1 | 8/2001 | Miyashita et al. | |
| 6,284,135 B1 | 9/2001 | Ookata | |
| 6,294,039 B1 | 9/2001 | Mahendran et al. | |
| 6,299,773 B1 * | 10/2001 | Takamura et al. | 210/500.23 |
| 6,315,895 B1 | 11/2001 | Summerton et al. | |
| 6,322,703 B1 * | 11/2001 | Taniguchi et al. | 210/636 |
| 6,325,928 B1 | 12/2001 | Pedersen et al. | |
| 6,337,018 B1 | 1/2002 | Mickols | |
| RE37,549 E | 2/2002 | Mahendran et al. | |
| 6,354,444 B1 | 3/2002 | Mahendran | |
| 6,375,848 B1 | 4/2002 | Cote et al. | |
| 6,423,784 B1 * | 7/2002 | Hamrock et al. | 525/326.2 |
| 6,440,303 B2 | 8/2002 | Spriegel | |
| D462,699 S | 9/2002 | Johnson et al. | |
| 6,495,041 B2 * | 12/2002 | Taniguchi et al. | 210/321.89 |
| 6,524,481 B2 | 2/2003 | Zha et al. | |
| 6,550,747 B2 | 4/2003 | Rabie et al. | |
| 6,555,005 B1 | 4/2003 | Zha et al. | |
| D478,913 S | 8/2003 | Johnson et al. | |
| 6,620,319 B2 | 9/2003 | Behmann et al. | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,721,529 B2 * | 4/2004 | Chen et al. | 399/313 |

| | | | | | |
|---|---|---|---|---|---|
| 6,723,758 B2 * | 4/2004 | Stone et al. ............... 521/27 | JP | 04-187224 | 7/1992 |
| 6,727,305 B1 | 4/2004 | Pavez Aranguiz | JP | 04-250898 | 9/1992 |
| 6,770,202 B1 | 8/2004 | Kidd et al. | JP | 04-265128 | 9/1992 |
| 6,790,912 B2 * | 9/2004 | Blong ..................... 525/197 | JP | 04-310223 | 11/1992 |
| 6,811,696 B2 * | 11/2004 | Wang et al. ........... 210/500.36 | JP | 05-023557 | 2/1993 |
| 6,861,466 B2 * | 3/2005 | Dadalas et al. ............ 524/544 | JP | 05-096136 | 4/1993 |
| 6,884,350 B2 * | 4/2005 | Muller ................ 210/500.36 | JP | 05-157654 | 6/1993 |
| 6,884,375 B2 * | 4/2005 | Wang et al. ................. 264/41 | JP | 05-285348 | 11/1993 |
| 6,890,435 B2 | 5/2005 | Ji et al. | JP | 06-071120 | 3/1994 |
| 6,890,645 B2 * | 5/2005 | Disse et al. ................ 428/323 | JP | 06-114240 | 4/1994 |
| 6,893,568 B1 | 5/2005 | Janson et al. | JP | 06-218237 | 8/1994 |
| 6,994,867 B1 | 2/2006 | Hossainy et al. | JP | 06-285496 | 10/1994 |
| 7,041,728 B2 * | 5/2006 | Zipplies et al. ............ 524/544 | JP | 06-343837 | 12/1994 |
| 2001/0027951 A1 | 10/2001 | Gungerich et al. | JP | 07-000770 | 1/1995 |
| 2002/0148767 A1 | 10/2002 | Johnson et al. | JP | 07-024272 | 1/1995 |
| 2002/0153299 A1 | 10/2002 | Mahendran et al. | JP | 07-155758 | 6/1995 |
| 2002/0195390 A1 | 12/2002 | Zha et al. | JP | 07-185268 | 7/1995 |
| 2003/0075504 A1 | 4/2003 | Zha et al. | JP | 07-185271 | 7/1995 |
| 2003/0089659 A1 | 5/2003 | Zha et al. | JP | 07-275665 | 10/1995 |
| 2003/0136746 A1 | 7/2003 | Behman et al. | JP | 08-010585 | 1/1996 |
| 2003/0141248 A1 | 7/2003 | Mahendran et al. | JP | 09-141063 | 6/1997 |
| 2003/0164332 A1 | 9/2003 | Mahendran et al. | JP | 09-220569 | 8/1997 |
| 2003/0178365 A1 | 9/2003 | Zha et al. | JP | 09324067 | * 12/1997 |
| 2003/0205519 A1 | 11/2003 | Zha et al. | JP | 10-156149 | 6/1998 |
| 2003/0226797 A1 | 12/2003 | Phelps | JP | 11-165200 | 6/1999 |
| 2003/0234221 A1 | 12/2003 | Johnson et al. | WO | 88/06200 | 8/1988 |
| 2004/0000520 A1 | 1/2004 | Gallagher et al. | WO | WO 90/00434 | 1/1990 |
| | | | WO | WO 93/02779 | 2/1993 |

FOREIGN PATENT DOCUMENTS

| | | |
|---|---|---|
| DE | 4 117 422 | 11/1992 |
| DE | 29906389 | 6/1999 |
| EP | 12557 B1 | 2/1983 |
| EP | 395133 B1 | 2/1995 |
| EP | 0 463 627 B1 | 5/1995 |
| EP | 492446 B1 | 11/1995 |
| EP | 0 763 758 A1 | 10/1996 |
| EP | 0 911 073 | 4/1999 |
| EP | 492942 B1 | 2/2000 |
| EP | 1 034 835 | 9/2000 |
| EP | 1 052 012 A1 | 11/2000 |
| EP | 920 904 A2 | 12/2000 |
| FR | 2 674 448 A1 | 2/1992 |
| GB | 2 253 572 A | 9/1992 |
| JP | 55-129155 | 10/1980 |
| JP | 58-088007 | 5/1983 |
| JP | 61-097006 | 5/1986 |
| JP | 61-107905 | 5/1986 |
| JP | S63-38884 | 7/1986 |
| JP | 61-192309 | 8/1986 |
| JP | 61-257203 | 11/1986 |
| JP | 61-263605 | 11/1986 |
| JP | 62-004408 | 1/1987 |
| JP | 62-114609 | 5/1987 |
| JP | 62-140607 | 6/1987 |
| JP | 62-179540 | 8/1987 |
| JP | 62-250908 | 10/1987 |
| JP | 63-097634 | 4/1988 |
| JP | 63-143905 | 6/1988 |
| JP | 63-143905 A2 | 6/1988 |
| JP | 01-307409 | 12/1989 |
| JP | 63-180254 | 2/1990 |
| JP | 02-164423 | 6/1990 |
| JP | 02-284035 | 11/1990 |
| JP | 03-018373 | 1/1991 |
| JP | 03-028797 | 2/1991 |
| JP | 31-010445 | 5/1991 |

| | | |
|---|---|---|
| WO | 93/15827 | 8/1993 |
| WO | WO 96/07470 | 3/1996 |
| WO | WO 9607470 A1 | 3/1996 |
| WO | WO 96/41676 | 12/1996 |
| WO | WO 98/22204 | 5/1998 |
| WO | 98/28066 | 7/1998 |
| WO | WO 99 59707 | 11/1999 |
| WO | WO 01/36075 | 5/2001 |

OTHER PUBLICATIONS

U.S. Appl. No. 10/674,694, filed Sep. 30, 2003, Zha et al.
U.S. Appl. No. 10/676,458, filed Sep. 30, 2003, Cox et al.
U.S. Appl. No. 10/738,628, filed Dec. 16, 2003, Muller et al.
U.S. Appl. No. 10/759,560, filed Jan. 15, 2004, Zha et al.
U.S. Appl. No. 10/774,041, filed Feb. 6, 2004, Zha et al.
Derwent Abstract Accession No. 2001-142268/15, J01 JP, A1, 2000342932 (Mitsubishi Rayon Co. Ltd.), Dec. 12, 2000.
Lloyd, D., "Microproous Membrane Formation Viz Thermally Induced Phase Separation. I. Solid-Liquid Phase Separation," J. Membrane Sci. 52:239-261 (1990).
Ramaswamy, S. et al., "Fabrication of Poly (ECTFE) membranes via thermally induced phase separation," J. Membrane Sci. 210:175-180 (2002).
RD 420013 (Anonymous), Apr., 1999.
Kaiya et al., "Water Purification Using Hollow Fiber Microfiltration Membranes," 6th World Filtration Congress, Nagoya, 1993, pp. 813-816.
UEDA et al., "Effects of Aeration on Suction Pressure in a Submerged Membrane Bioreactor," *Wat. Res.* vol. 31, No. 3, 1997, pp. 489-494.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Zenon, "Proposal for Zee Weed® Membrane Filtration Equipment System for the City of Westminster, Colorado, Proposal Number 479-99," Mar. 2000, entire publication.

* cited by examiner

MEMBRANE POLYMER COMPOSITIONS

RELATED APPLICATION

This application is a continuation, under 35 U.S.C. § 120, of International patent application Ser. No. PCT/AU02/00784, filed on Jun. 14, 2002 under the Patent Cooperation Treaty (PCT), which was published by the International Bureau in English on Dec. 27, 2002, which designates the U.S. and claims the benefit of Australian Provisional Patent Application No. PR 5843, filed Jun. 20, 2001.

FIELD OF THE INVENTION

The invention relates to compositions suitable for use in forming membranes, in particular for forming hollow fiber membranes for use in microfiltration. The invention also relates to membranes prepared from such compositions, and to methods of their preparation.

BACKGROUND OF THE INVENTION

The following discussion is not to be construed as an admission with regard to the common general knowledge in Australia.

Synthetic membranes are used for a variety of applications including desalination, gas separation, filtration, and dialysis. The properties of the membranes vary depending on the morphology of the membrane i.e. properties such as symmetry, pore shape and pore size and the polymeric material used to form the membrane.

Different membranes can be used for specific separation processes, including microfiltration, ultrafiltration, and reverse osmosis. Microfiltration and ultrafiltration are pressure driven processes and are distinguished by the size of the particle or molecule that the membrane is capable of retaining or passing. Microfiltration can remove very fine colloidal particles in the micrometer and submicrometer range. As a general rule, microfiltration can filter particles down to 0.1 µm, whereas ultrafiltration can retain particles as small as 0.01 µm and smaller. Reverse Osmosis operates on an even smaller scale.

As the size of the particles to be separated decreases, the pore size of the membrane decreases and the pressure required to carry out the separation increases.

A large surface area is needed when a large filtrate flow is required. One known technique to make filtration apparatus more compact is to form a membrane in the shape of a hollow porous fiber. Modules of such fibers can be made with an extremely large surface area per unit volume.

Microporous synthetic membranes are particularly suitable for use in hollow fibers and are produced by phase inversion. In this process, at least one polymer is dissolved in an appropriate solvent and a suitable viscosity of the solution is achieved. The polymer solution can be cast as a film or hollow fiber, and then immersed in precipitation bath such as water. This causes separation of the homogeneous polymer solution into a solid polymer and liquid solvent phase. The precipitated polymer forms a porous structure containing a network of uniform pores. Production parameters that affect the membrane structure and properties include the polymer concentration, the precipitation media and temperature and the amount of solvent and non-solvent in the polymer solution. These factors can be varied to produce microporous membranes with a large range of pore sizes (from less than 0.1 to 20 µm), and altering chemical, thermal and mechanical properties.

Microporous phase inversion membranes are particularly well suited to the application of removal of viruses and bacteria. Of all types of membranes, the hollow fiber contains the largest membrane area per unit volume.

Flat sheet membranes are prepared by bringing a polymer solution consisting of at least one polymer and solvent into contact with a coagulation bath. The solvent diffuses outwards into the coagulation bath and the precipitating solution will diffuse into the cast film. After a given period of time, the exchange of the non-solvent and solvent has proceeded such that the solution becomes thermodynamically unstable and demixing occurs. Finally, a flat sheet is obtained with an asymmetric or symmetric structure.

Hydrophobic surfaces are defined as "water hating" and hydrophilic surfaces as "water loving". Many of the polymers that porous membranes are made of are hydrophobic polymers. Water can be forced through a hydrophobic membrane by use of sufficient pressure, but the pressure needed is very high (150–300 psi), and a membrane may be damaged at such pressures and generally does not become wetted evenly.

Hydrophobic microporous membranes are characterized by their excellent chemical resistance, biocompatibility, low swelling and good separation performance. Thus, when used in water filtration applications, hydrophobic membranes need to be hydrophilized or "wet out" to allow water permeation. Some hydrophilic materials are not suitable for microfiltration and ultrafiltration membranes that require mechanical strength and thermal stability since water molecules can play the role of plasticizers.

Currently, poly(tetrafluoroethylene) (PTFE), Polyethylene (PE), Polypropylene (PP) and poly(vinylidene fluoride) (PVDF) are the most popular and available hydrophobic membrane materials. Poly(vinylidene fluoride) (PVDF) is a semi-crystalline polymer containing a crystalline phase and an amorphous phase. The crystalline phase provides good thermal stability whilst the amorphous phase adds some flexibility to the membrane. PVDF exhibits a number of desirable characteristics for membrane applications, including thermal resistance, reasonable chemical resistance (to a range of corrosive chemicals, including sodium hypochlorite), and weather (UV) resistance.

While PVDF has to date proven to be the most desirable material from a range of materials suitable for microporous membranes, the search continues for membrane materials which will provide better chemical stability and performance while retaining the desired physical properties required to allow the membranes to be formed and worked in an appropriate manner.

In particular, a membrane is required which has a superior resistance (compared to PVDF) to more aggressive chemical species, in particular, oxidizing agents such as sodium hypochlorite and to conditions of high pH i.e. resistance to caustic solutions.

SUMMARY OF THE INVENTION

According to a first aspect the invention provides the use of polymer suitable for forming into an ultrafiltration or microfiltration membrane, said polymer being a terpolymer of tetrafluoroethylene (TFE), PVDF and hexafluoropropylene monomers.

Preferably, the polymer includes from 20–65% PVDF monomer, from 10–20% hexafluoropropylene monomer and 30–70% TFE.

More preferably, the polymer includes from 30–50% PVDF monomer, from 15–20% hexafluoropropylene, and from 30–55% TFE. Even more preferably, the polymer includes from 35–40% PVDF and 17–20% HFP and 40–48% TFE.

Most preferably, the polymer is a terpolymer of 44.6% tetrafluoroethylene (TFE) monomers, 36.5% PVDF monomers, and 18.9% hexafluoropropylene monomers.

Unless otherwise indicated, all percentages are expressed as weight percentages.

According to a second aspect the invention provides an ultrafiltration and/or microfiltration membrane formed from a terpolymer including TFE monomers, PVDF monomer and hexafluoropropylene monomer. Preferably the monomer composition is approximately 44.6% tetrafluoroethylene (TFE) monomer, 36.5% PVDF monomer and 18.9% hexafluoropropylene monomer.

The membranes of the second aspect have an improved chemical stability to oxidizing agents and caustic soda relative to a membrane formed from PVDF alone.

According to a third aspect the invention provides a method of manufacturing a microfiltration or ultrafiltration membrane including the step of casting a membrane from a composition including a terpolymer of 44.6% tetrafluoroethylene (TFE) monomer, 36.5% PVDF monomer and 18.9% hexafluoropropylene monomer.

Preferably, the membrane is in the form of a hollow fiber, cast by the TIPS procedure, or more preferably by the DIPS procedure.

Most preferably, the polymer used is THV 220G, obtained from Dyneon® (3M) as a solvent soluble fluoropolymer. The polymer is a combination of approximately 44.6% tetrafluoroethylene (TFE) monomer, 36.5% PVDF monomer, and 18.9% hexafluoropropylene monomer.

According to a fourth aspect, the invention provides a method of forming a polymeric ultrafiltration or microfiltration membrane including the steps of:

preparing a leachant resistant membrane dope;

incorporating a leachable pore forming agent into the dope;

casting a membrane; and leaching said leachable pore forming agent from said membrane with said leachant.

Preferably, the leachant resistant membrane polymer includes a terpolymer of TFE, PVDF, and hexafluoropropylene. More preferably, the polymer includes 44.6% tetrafluoroethylene (TFE) monomers, 36.5% PVDF monomers, and 18.9% hexafluoropropylene monomers.

Preferably, the leachable pore forming agent is silica, and the leachant is a caustic solution, but the pore forming agent may for preference be any inorganic solid with an average particle size less than 1 micron while the leachant may be any material/solution that leaches the said pore forming agent from the membrane.

According to fifth aspect, the invention provides a method of improving the structure of a polymeric ultrafiltration or microfiltration membrane by the addition of a nucleating agent to a membrane dope. Preferably the nucleating agent is added in catalytic amounts and most preferably it is $TiO_2$, however, any insoluble/inert (unleachable) inorganic solid with an average particle size less than 1 micron may be used.

According to a sixth aspect, the invention provides an elastic polymeric ultrafiltration or microfiltration membrane having an asymmetric cross section defining a large-pore face and a small-pore face; said membrane having a higher flux at a given pressure from said large-pore face to said small-pore face than from said small-pore face to said large-pore face.

Preferably the elastic membrane is formed from the preferred membrane forming mixtures of the preceding aspects, and may also be formed using the addition of leachable pore forming agents and/or nucleating agents.

The invention will now be described with particular reference to specific examples. It will be appreciated, however, that the inventive concept disclosed therein is not limited to these specific examples

DETAILED DESCRIPTION OF THE PREFERRED EMBODIMENT

Membrane Formation

DIPS Procedure

THV 220G, obtained from Dyneon® Corp (3M) was dissolved in N-methylpyrrolidone (NMP) at approximately 20 wt. %. A flat sheet membrane was cast from this solution and precipitated in water at 60° C. before being examined using scanning electron microscopy (SEM).

A standard DIPS process was employed as follows: Polymer solutions were mixed and heated to around 50° C. and pumped (spun) through a die into a 5 meter water-filled quench (or solidification) bath at 65° C. Non-solvent (lumen) consisting of 20% NMP, 10% water and 70% polyethylene glycol (PEG200) was fed through the inside of the die to form the lumen. The hollow fiber was then spun into the quench bath and solidified, before being run out of the bath over driven rollers onto a winder situated in a secondary water bath at room temperature to complete the quench and washing of the fiber.

The membrane structure was reasonable although a skin was found on the surface of the membrane that prevented exposure of surface pores.

The caustic resistance of the membrane was tested by placing a sample of the flat sheet into 5 wt. % caustic solution and comparing the appearance with a control of PVDF membrane cast by the TIPS process.

Both samples were thoroughly wet out with alcohol prior to immersion in the caustic solution. The THV samples become transparent upon complete wetting. The results of the caustic immersion test are shown in table 1.

Table 1 shows the results of the caustic resistance tests. The results indicate that while the membranes are not impervious to caustic, as would be the case for a material like Teflon, they show extremely limited degradation for an extended period of time in a comparatively strong caustic solution. All subsequent exposures to 5% solutions have shown the same result, that a slight yellowing occurs upon immediate contact with the solution but no further degradation (either visually or affecting the membrane properties) occurs.

In addition to color changes, the stiffness of both the PVDF and the THV samples were examined. The PVDF membrane had lost a marked amount of flexibility and was quite brittle, while by contrast, the THV sample appeared to be relatively unaffected.

The results strongly suggest that no detrimental modification of the polymer membranes takes place as a result of such caustic immersion.

TABLE 1

| Date/Time elapsed | THV 200 Sheet | PVDF Fiber (TIPS) |
|---|---|---|
| 5 mins | Colorless | Light brown |
| 10 mins | Colorless | Light brown |
| 1 hr | Colorless | Darker brown |
| 2 days 19 hrs | Colorless | Dark brown/reddish |
| 3 days | Very slight yellowing | Very dark brown |
| 3 days 18 hrs | Very slight yellowing | Very dark brown |
| 4 days | Very slight yellowing | Very dark brown |
| 5 days | Very slight yellowing | Slightly darker/coppery |
| 6 days | Very slight yellowing | Slightly darker/coppery |
| 7 days | Very slight yellowing | Very dark turning black |
| 10 days | Very slight yellowing | Very dark turning black |
| 11 days | Very slight yellowing | Very dark turning black |

Modification of Membrane Hydrophobicity/Hydrophilicity

Those skilled in the art will appreciate the desirability of preparing membranes that are hydrophilic in character. For instance, as described earlier hydrophilic membranes are simpler to operate than hydrophobic membranes as they do not require an additional wetting step.

It was established in the present case that THV 220G is compatible with Lutonal A25 (Polyvinylethylether) at concentrations of around 2%. Lutonal A25 makes the DIPS membranes of the present application less hydrophobic.

Other than modifying hydrophobicity, the addition of Lutonal A25 appeared to make little difference in the physical structure of the membrane, apart from opening the membrane structure slightly. However membranes prepared with or without Lutonal are still acceptable in terms of their structure.

The addition of Lutonal A25 reduced the mixing time of the dopes quite dramatically.

Other elements of the DIPS process have also been investigated in conjunction with the use of THV 220G as a membrane polymer. It was found that non solvents can be used in a dope mix such as the addition of 5% glycerine triacetate (GTA) into the mixture without undue detrimental effects.

Leachable Dopants

In order to produce membranes without a dense surface skin and having a more hydrophilic nature, silica was added to the dope with the intention of leaching the silica out of the matrix by the use of a caustic solution.

A hydrophilic silica Aerosil 200 and a hydrophobic silica Aerosil R972 were tested separately as additives to the THV 220G membrane mixture. The dopes were cast into flat sheet membranes, and were quenched in hot water at 60° C. as described previously. Once the membranes had been cast, a portion thereof was leached in a 5% aqueous caustic solution at room temperature for 14 hours. Without wishing to be bound by theory, it is believed that the silica reacts with caustic to make the membrane hydrophilic as discussed below. Also, the leaching using caustic soda provides a membrane of good open structure. A number of membranes containing silica were cast. The results are shown in Table 2.

TABLE 2

| Dope | Hydrophilicity | Dope Viscosity |
|---|---|---|
| 18% THV, 8% Aerosil R972, 2% Lutonal A25, 72% NMP | Extremely hydrophilic | Very high viscosity |
| 21% THV, 5% Aerosil 200, 2% Lutonal A25, 72% NMP | Hydrophilic | Moderate (honey-like) viscosity |
| 20% THV, 10% R972, 2% Lutonal A25, 68% NMP | Extremely hydrophilic | Extremely viscous (paste-like) |
| 20% THV, 5% R972, 75% NMP | Extremely hydrophilic | Moderate (honey-like) viscosity |
| 20% THV, 0.5% R972, 2% Lutonal A25, 77.5% NMP | Hydrophobic | Low viscosity |
| 20% THV, 80% NMP | Extremely Hydrophobic | Low viscosity |
| 18% THV, 5% R972, 2% Lutonal A25, 75% NMP | | Moderate (honey-like) viscosity |
| 20% THV, 5% R972, 5% Mg(OH)$_2$, 2% Lutonal A25, 68% NMP | — | Extreme viscosity - Far too high to cast |

Table 2 demonstrates that the silica is required in reasonably high concentrations to make the membranes hydrophilic. It also shows the trend of increasing viscosity with increasing silica content.

After the membranes were cast, and prior to leaching, the membranes were examined using scanning electron microscopy. The structures were generally extremely promising with the surface of the sheets completely open and totally free of any skin. The cross-sectional appearance was more like a conglomerate of precipitated particles, rather than a true honeycomb like structure.

The best form of the silica appeared to be the hydrophobic Aerosil R972, although both forms of silica produced a hydrophilic membrane with a highly porous structure.

Subsequently placing the sample in caustic soda to leach the silica provided a dramatic opening up in the membrane structure even further. The result of the leaching was a change in the cross-section from the abovementioned conglomerate-like structure to the more traditional lace or sponge-like formation.

The optimal dope for forming a DIPS polymer appears to be from a mixture of 72% NMP, 20% THV, 6% silica and 2% Lutonal. This provides a hydrophilic membrane from a dope possessing a viscosity in the range that can be easily pumped.

A number of hollow fiber membranes were prepared from the above dope. The wetting characteristics were as desired and the membrane structure showed an extremely open surface. While 6% silica Was used in the present invention, it will be appreciated that the quantity can vary significantly without departing from the present inventive concept.

Fibers incorporating silica with thicker walls were prepared and the current properties of the fiber membranes were examined. The fiber was then subject to leaching with a 5% caustic solution at room temperature for 18 hours.

It can be seen that leaching the membrane changes the permeability and bubble points significantly without altering the desirable physical properties of the membrane. The leaching of the silica from the membranes has a positive effect upon permeability.

Thus, before leaching, the membrane had very few pores and extremely low flows. After leaching, however, the situation is reversed and there are a multitude of pores and a high flux.

A long leaching time is not necessarily required and can be incorporated in the production process as a post-treatment of the final modular product. The leaching process can be carried out at any time, however there is an advantage to postponing the leaching process as long as possible, since any damage to the surface of the fibers during handling can be overcome by leaching which physically increases the porosity of the membrane. Existing PVDF membrane surfaces can be damaged irreconcilably during production, resulting in a decrease in permeability and flux of the fibers.

SEM analysis of the membranes showed a high degree of asymmetry. Asymmetry is defined as a gradual increase in pore size throughout the membrane cross-section, such that the pores at one surface of the hollow fiber are larger than the other. In this case, the pore size increase was seen from the outer surface where the pores were smallest (and a quite dense surface layer was present) to the inner surface where the pores were significantly larger than those on the outer surface.

Preparation of the fibers was run at 65° C. rather than 50° C. as in a typical DIPS process. Increasing the quench bath temperature by 10–15° C. dramatically affects the surface structure. The higher temperature gives a much more open surface. The use of the higher temperatures therefore accordingly means it is feasible to increase the polymer concentrations and possibly the silica concentration if it is desired to bolster the existing membrane and increase the mechanical strength.

Further it has been found that a more particular mixing procedure contributes to the success of forming a membrane of high permeability. Mixing constituents together in a random manner does not produce such a good result as following a more stringent procedure whereby the Aerosil R972 is dissolved in the total quantity of NMP and this solution is allowed to degas. The polymer pellets are mixed with the liquid Lutonal A25 to coat the pellets. When these two procedures are complete, the two mixtures are combined. The advantage of this appears to be that the silica is dispersed effectively and does not clump (which can lead to macrovoids) and also, the pellets do not clump (which has the effect of increasing mixing time and consistency of the dope) since they are coated with a sufficient quantity of Lutonal A25 for a sufficient time to allow them to dissolve individually.

As well as silica, the leaching process allows for the introduction of other functionalities into the membrane, such as introducing hydrolyzable esters to produce groups for anchoring functional species to membranes.

Surprisingly, it has also been found that the membrane remains hydrophilic after leaching. Again, without wishing to be bound by theory, the silica particles have a size in the order of manometers so consequently the silica disperses homogeneously throughout the polymer solution. When the polymer is precipitated in the spinning process, there is a degree of encapsulation of the $SiO_2$ particles within the polymer matrix. Some of the particles (or the conglomerates formed by several silica particles) are wholly encapsulated by the precipitating polymer, some are completely free of any adhesion to the polymer (i.e. they lie in the pores of the polymer matrix) and some of the particles are partially encapsulated by the polymer so that a proportion of the particle is exposed to the 'pore' or to fluid transfer.

When contacted with caustic, it is believed that these particles will be destroyed from the accessible side, leaving that part of the particle in touch with the polymer matrix remaining. The remainder of the silica particle adheres to the polymer matrix by hydrophobic interaction and/or mechanical anchoring. The inside of the particle wall is hydrophilic because it consists of OH groups attached to silica. Because the silica is connected to hydrophobic groups on the other side, it cannot be further dissolved.

Thus, when the membranes are treated with caustic solution, the free unencapsulated $SiO_2$ reacts to form soluble sodium silicates, while the semi-exposed particles undergo a partial reaction to form a water-loving surface (bearing in mind that given the opportunity, such particles would have dissolved fully). It is believed that the pores in the polymer matrix formed during the phase inversion stage yet filled with $SiO_2$ particles are cleaned out during leaching, giving a very open, hydrophilic membrane.

Nucleating Agents $TiO_2$ (titania) was also added to the membrane at a variety of concentrations. $TiO_2$ has been added to membrane forming mixtures previously as a filler to provide abrasion resistance or to act as a nucleating agent, to increase the rate of fiber solidification.

However, surprisingly in the present case, it was found that the addition of $TiO_2$ in concentrations below that used for reinforcement of membranes, a high degree of asymmetry was introduced into the membranes. In particular, this was as a result of the formation of a dense outer layer. Without wishing to be bound by theory, the applicant believes that the $TiO_2$ particles provide a site for phase inversion or precipitation to begin. In hollow fiber membranes prepared by the DIPS process, the high number of fast solidification sites at which precipitation occurs means that the pores formed near the membrane surface are smaller, fewer and further between.

The use of too much titania can cause a dense outer layer on the membrane to restrict permeability. Further, as the titania disperses very well throughout the dope, only of the order of a catalytic amount is required. For example, only about 0.1–0.2 wt. % titania need be incorporated into the membrane, although as much as 3% can be used depending on the desired effect.

A dope formulation giving good results is 20 wt. % THV 220G, 6 wt. % Aerosil R972, 2 wt. % Lutonal A25, 0.2 wt. % $TiO_2$, and 71.8 wt. % N-methylpyrrolidone.

A dope having the above formulation was mixed and cast according to the DIPS method. They were then leached in 5% caustic soda solution for approximately 24 hours and then soaked in glycerol. Soaking fibers in glycerol or the like is a highly desirable step, since the material is relatively flexible and will allow pores to collapse. The results for the TiO$_2$ trial fibers are given as Table 3.

TABLE 3

| Property | Results for THV 200 |
|---|---|
| Permeability (LMH) | 3771 |
| Bubble Point (kPa) | 150 |
| Burst Point (kPa) | 150–160 |
| Break Extension (%) | 245 |
| Break Force(N) | 0.72 |
| Fiber Dimensions (μM) | 1080 OD, 535 ID |
| Break Force per unit area (N/cm$^2$) | 105 |

Table 3 lists the properties of the membranes made which incorporate a small proportion of TiO$_2$. The most apparent property to note is the high permeability of the membrane.

High Polymer Concentrations

Attempts at making polymer concentrations above 20 wt. % were attempted. Doing so however caused alternative problems mainly based around a dramatic increase in viscosity. Once the polymer portion rises to above 25 wt. %, viscosity becomes too high to pump in conventional pumps. However, high polymer concentrations were seen to correlate with an increase in the mechanical strength of the membrane. Optimal results of workability and strength were achieved with the hollow fiber having a polymer concentration of 22%. The best was seen to be 22 wt. % THV 220G, 6 wt. % Aerosil R972, 2 wt. % Lutonal A25 and 70 wt. % N-methylpyrrolidone. Concentrations as high as 30 wt. % polymer did produce a feasible membrane. The high polymer concentration membranes were leached in a 5% caustic solution for 24 hours and then soaked in glycerol. The results are shown in Table 4. A point of note is that the increase in polymer concentration or the addition of TiO$_2$ does not appear to improve the bubble point or burst pressure of the fibers in any way. The mechanical strength of the fiber appears to be mainly a function of wall thickness and lumen diameter.

TABLE 4

| Property | Results for THV 200 |
|---|---|
| Permeability (LMH) | 2821 |
| Bubble Point (kPa) | 150 |
| Burst Point (kPa) | 150–160 |
| Break Extension (%) | 240 |
| Break Force (N) | 0.64 |
| Fiber Dimensions (μM) | 930 OD, 542 ID |
| Break Force per unit area (N/cm$^2$) | 145 |

Table 4 lists the properties of the membrane made using 22% polymer (without TiO$_2$). Comparing the results to Table 3, the membrane exhibit very similar characteristics with the exception that Table 3 indicates possibly a higher permeability/flux for titania containing membranes.

Physical Properties of Membranes

The bubble point measurements in Tables 3 and 4 do not give an entirely accurate determination of the bubble point, the pore size or molecular weight cut off of the membrane because the membranes are somewhat rubbery and flexible so that under pressure the membrane expands and hence the pores stretch like a rubber band. It has been observed that the fibers increase in size slightly under a backwash pressure of as low as 100 Kilopascals.

This behavior is apparently due to the high elastic nature of the polymer which also gives extremely high break tension described in Table 4. This elastic behavior would adequately describe the apparently low bubble point recorded for the membrane, since as the membrane is stretched by the pressure applied, the pores would be stretching proportional to the overall size increase of the fiber. This property is extremely valuable for cleaning a membrane, since the pores may be opened up by the application of a liquid backwash and any material fouling the pores may be easily dislodged and flushed away. The elastic behavior also indicates that the membrane (and hence the pores) may recover up to 100% of such a deformation, thus the pores would return to their original size.

To demonstrate this characteristic behavior, the permeability and fluxes of the fibers were measured. Permeability and flux are typically measured with a filtration direction (direction of the filtrate flow relative to the membrane surfaces) outside-in with the filtrate collected from the inside of the hollow fiber. To prove that the pore structure is increasing in size, the flow was reversed so that the filtration direction was inside-out, with filtrate emerging on the outer side of the fiber.

Table 5 shows the results of these "outside-in" and "inside-out" tests

TABLE 5

| Pressure (kPa) | Flux Outside-In (L/m$^2$ · hr) | Flux Inside-Out (L/m$^2$ · hr) |
|---|---|---|
| 22 | 919 | 1134 |
| 48 | 1550 | 2695 |
| 58 | 1374 | 3575 |
| 67 | 1327 | 4734 |
| 73 | 1353 | 5308 |
| 98 | 1322 | 7616 |
| 124 | 1283 | 11301 |

Table 5 and FIG. 1 show that the flux for inside-out flow increases as the pressure increases, while the outside-in flow remains almost completely constant. This indicates that the pressure applied from the inside is expanding the pores to allow far higher flows. This elasticity described is one of the most desirable properties of the membranes discussed.

Potting

As a result of this one of the desirable features of the membranes according to the present invention is their ability to be potted directly into epoxy. PVDF membranes require a more flexible potting material such as polyurethane to prevent damage to the fibers. PVDF fibers can break with relative ease if the fibers are potted in a potting material which lacks any flexibility. If there is no flexibility in the potting material there can be breakage of the fiber at the point where the fiber enters the pot. By contrast, the membranes of the invention can be potted into epoxy potting material and the fibers will not be significantly damaged during use. In fact, the membranes of the present invention can be stretched to the normal break extension of the fiber when pulled parallel to the pot surface i.e. 90° to the potted direction.

The comparison of the properties of the THV membranes of the present application and PVDF prepared with the DIPS process are shown in Table 6.

TABLE 6

| Property | THV 200 (after leaching) | DIPS PVDF |
|---|---|---|
| Hydrophilicity | Spontaneous Wetting | Satisfactory |
| Chlorine Resistance | Highly Resistant | Resistant |

TABLE 6-continued

| Property | THV 200 (after leaching) | DIPS PVDF |
|---|---|---|
| Caustic Resistance | Highly resistant | No resistance |
| Break Extension (%) | 245 | <145 |
| Break Force (N) | 0.73 | <1.0 |
| Permeability (LMH @ 100 kPa) | 3000–4000 | ca. 300 |
| Bubble Point (kPa) | ca. 150 | ca. 350–400 |
| Surface structure | Extremely open | Good |
| Asymmetry | Excellent | Excellent |

Table 6 gives a comparison between THV membranes manufactured using the DIPS process and the best (to date) PVDF membranes manufactured using the DIPS process. The main differences are the spontaneous wetting of the THV membrane and also the high clean water permeability, both of which are lacking in current PVDF membranes. The other difference lies in comparing the stiffness of the membranes, which is directly attributable to the polymers used to produce the membrane.

It would be appreciated by those skilled in the art that while the invention has been described with particular reference to one embodiment, many variations are possible without deviating from the inventive concept disclosed herein.

What is claimed is:

1. A membrane comprising:
    a terpolymer of about 35 wt. % to about 40 wt. % of polyvinylidene fluoride monomer, from about 17 wt. % to about 20 wt. % of hexafluoropropylene monomer, and from about 40 wt. % to about 48 wt. % of tetrafluoroethylene monomer; and
    a hydrophobicity modifying agent.

2. The membrane according to claim 1, wherein the terpolymer comprises about 36.5 wt. % of polyvinylidene fluoride monomer, about 18.9 wt. % of hexafluoropropylene monomer, and about 44.6 wt. % of tetrafluoroethylene monomer.

3. The membrane according to claim 1, the filtration membrane having an asymmetric cross section defining a large-pore face and a small-pore face, the membrane having a higher flux at a predetermined pressure from the large-pore face to the small-pore face than from the small-pore face to the large-pore face.

4. The membrane according to claim 1, wherein the filtration membrane comprises a hollow fiber.

5. The membrane according to claim 1, wherein the hydrophobicity modifying agent comprises a polyvinylethylether.

6. The membrane according to claim 1, wherein the membrane comprises about 2 wt. % of the hydrophobicity modifying agent.

7. A method of preparing a polymeric membrane comprising:
    preparing a membrane dope resistant to a leachant, the membrane dope comprising a terpolymer derived from about 35 wt. % to about 40 wt. % of polyvinylidene fluoride monomer, about 17 wt. % to about 20 wt. % of hexafluoropropylene monomer, and about 40 wt. % to about 48 wt. % of tetrafluoroethylene monomer, and a leachable pore forming agent;
    casting the membrane dope into the polymeric membrane; and
    leaching the leachable pore forming agent from the polymeric membrane with the leachant.

8. The method according to claim 7, wherein the terpolymer comprises about 36.5 wt. % of repeating units derived from the polyvinylidene fluoride monomer, about 18.9 wt. % of repeating units derived from the hexafluoropropylene monomer, and about 44.6 wt. % of repeating units derived from the tetrafluoroethylene monomer.

9. The method according to claim 7, further comprising the step of adding a polyvinylethylether to the membrane dope as a hydrophobicity modifying agent.

10. The method according to claim 7, wherein the leachable pore forming agent comprises an inorganic solid having an average particle size of less than about 1 micron.

11. The method of claim 7, wherein the leachable pore forming agent comprises leachable silica, and wherein the leachant comprises a caustic solution.

12. A method of casting a polymeric membrane, the method comprising:
    preparing a membrane dope comprising a terpolymer and a catalytic amount of a nucleating agent, wherein said terpolymer is derived from about 35 wt. % to about 40 wt. % of polyvinylidene fluoride monomer, from about 17 wt. % to about 20 wt. % of hexafluoropropylene monomer, and from about 40 wt. % to about 48 wt. % of tetrafluoroethylene monomer; and
    casting a filtration membrane from the membrane dope.

13. The method according to claim 12, wherein the nucleating agent comprises an insoluble inorganic solid or an inert inorganic solid.

14. The method according to claim 12, wherein the nucleating agent has an average particle size of less than about 1 micron.

15. The method according to claim 12, wherein the nucleating agent comprises $TiO_2$.

* * * * *

UNITED STATES PATENT AND TRADEMARK OFFICE
CERTIFICATE OF CORRECTION

PATENT NO. : 7,226,541 B2
APPLICATION NO. : 10/738628
DATED : June 5, 2007
INVENTOR(S) : Heinz-Joachim Muller et al.

Page 1 of 1

It is certified that error appears in the above-identified patent and that said Letters Patent is hereby corrected as shown below:

Title Page, Item (73) Assignee should read as follows:

(73) Assignee: Siemens Water Technologies Corp., Warrendale, PA (US)

Signed and Sealed this
Eighteenth Day of June, 2013

Teresa Stanek Rea
*Acting Director of the United States Patent and Trademark Office*